(12) United States Patent
Deligne et al.

(10) Patent No.: US 7,783,484 B2
(45) Date of Patent: *Aug. 24, 2010

(54) APPARATUS FOR REDUCING SPURIOUS INSERTIONS IN SPEECH RECOGNITION

(75) Inventors: Sabine V. Deligne, New York, NY (US); Lidia L. Mangu, New York, NY (US)

(73) Assignee: Nuance Communications, Inc., Burlington, MA (US)

( * ) Notice: Subject to any disclaimer, the term of this patent is extended or adjusted under 35 U.S.C. 154(b) by 27 days.

This patent is subject to a terminal disclaimer.

(21) Appl. No.: 12/174,344

(22) Filed: Jul. 16, 2008

(65) Prior Publication Data

US 2008/0281593 A1 Nov. 13, 2008

Related U.S. Application Data

(63) Continuation of application No. 10/407,116, filed on Apr. 4, 2003, now Pat. No. 7,409,345.

(51) Int. Cl.
*G10L 15/04* (2006.01)
(52) U.S. Cl. ........................ 704/254; 704/231; 704/240; 704/251
(58) Field of Classification Search ................ 704/249, 704/254, 231, 240, 241
See application file for complete search history.

(56) References Cited

U.S. PATENT DOCUMENTS 4,833,712 A * 5/1989 Bahl et al. .................. 704/243
5,729,656 A * 3/1998 Nahamoo et al. ........... 704/254
5,799,276 A * 8/1998 Komissarchik et al. ...... 704/251
7,054,810 B2 * 5/2006 Gao et al. ................... 704/231
7,181,395 B1 * 2/2007 Deligne et al. ............. 704/249
7,409,345 B2 * 8/2008 Deligne et al. ............. 704/254

OTHER PUBLICATIONS

Ramabhadran B Et Al: "Acoustics-Only Based Automatic Phonetic Baseform Generation" Seattle, WA, May 12-15, 1998, New York, NY: IEEE, US, vol. Conf. 23, May 12, 1998, pp. 309-312, XP000854577 ISBN: 0-7803-4429-4.*
Bahl et al: "Automatic phonetic baseform determination" 1991, ICASSP-91, pp. 173-176.*
Maison: "Automatic Baseform Generation from Acoustic Data" 2003, research.ibm.com.*
Ma et al: "An Approach to Automatic Phonetic Baseform Generation Based on Bayesian Networks" Sep. 3-7, 2001, Eurospeech-2001, 1453-1457.*

(Continued)

*Primary Examiner*—Talivaldis Ivars Smits
*Assistant Examiner*—Isabel Kadooire
(74) *Attorney, Agent, or Firm*—Wolf, Greenfield & Sacks, P.C.

(57) ABSTRACT

Techniques for improving an automatic baseform generation system. More particularly, the invention provides techniques for reducing insertion of spurious speech events in a word or phone sequence generated by an automatic baseform generation system. Such automatic baseform generation techniques may be accomplished by enhancing the scores of long-lasting speech events with respect to the scores of short-lasting events. For example, this may be achieved by merging competing candidates that relate to the same speech event (e.g., phone or word) and that overlap in time into a single candidate, the score of which may be equal to the sum of the scores of the merged candidates.

11 Claims, 3 Drawing Sheets

OTHER PUBLICATIONS

U.S. Appl. No. 09/698,470, filed Oct. 27, 2000, "Methods and Apparatus for Automatic Generation of Multiple Pronunciations from Acoustic Data."

Ramabhadran et al. "Acoustics-only based automatic phonetic baseform generation", ICASSP (1998).

Ramabhadran et al. "Phonological rules for enhancing acoustic enrollment of unknown words", ICSLP (1998).

Rose et al., "Speech recognition using automatically derived baseforms", ICASSP (1997).

L.E. Baum et al., "A Maximization Technique Occurring in the Statistical Analysis of Probabalistic Functions of Markov Chains," v. 41, No. 1, pp. 164-171, 1970.

S. Deligne et al., "Automatic Generation and Selection of Multiple Pronunciations for Dynamic Vocabularies," ICASSP, 4 p: 2001.

L. Rabiner and B.H. Juang, "Signal Processing and Analysis Methods for Speech Recognition," Prentice Hall Signal Processing Series, Chapter 3, pp. 69-117, 1993.

* cited by examiner

APPARATUS FOR REDUCING SPURIOUS INSERTIONS IN SPEECH RECOGNITION

CROSS-REFERENCE TO RELATED APPLICATION(S)

This application is a continuation of pending U.S. application Ser. No. 10/407,116, filed on Apr. 4, 2003 the disclosure of which is incorporated by reference herein.

FIELD OF THE INVENTION

The present invention generally relates to speech recognition systems and, more particularly, to techniques for reducing the number of spurious phone insertions in a transcription output by an automatic baseform generation system associated with a speech recognition system.

BACKGROUND OF THE INVENTION

Conventional speech recognition systems commonly insert spurious short speech events (e.g., words, phones) within the correctly recognized word or phone sequence. This may occur in a variety of contexts such as, for example: large vocabulary speech recognition where short grammatical words are often mistakenly inserted; and baseform generation which is used to automatically generate phonetic baseforms, i.e., sequence(s) of phones representing the pronunciation(s) of words.

Conventional acoustics-only baseform generation systems, where the phonetic baseforms are generated from acoustic data only, are especially prone to spurious phone insertion as the acoustic properties of certain phones, such as fricatives and plosives, for example, can easily be confused with those of non-speech segments (e.g., short pauses).

As is known, conventional acoustics-only baseform generation systems generate a phonetic baseform by retrieving the sequence of phones that has the highest likelihood, where the likelihood of the sequence of phones is computed by accumulating the scores of the subphone units in the hypothesized sequence. The score of a subphone unit is a combination of an acoustic score (e.g., measuring the acoustic match between the acoustic observation and the acoustic model of the subphone unit) and of a transition score (e.g., measuring the transition match between the previous subphone unit and the current subphone unit).

Examples of existing acoustics-only baseform generation systems include those described in R. C. Rose et al., "Speech Recognition Using Automatically Derived Baseforms," ICASSP 1997; and B. Ramabhadran et al., "Acoustics-Only Based Automatic Phonetic Baseform Generation," ICASSP 1998, the disclosures of which are incorporated by reference herein. An example of an existing acoustics-only baseform generation system that filters the generated baseforms by using a set of phonological rules is described in B. Ramabhadran et al., "Phonological Rules for Enhancing Acoustic Enrollment of Unknown Words," ICSLP 98, the disclosure of which is incorporated by reference herein.

SUMMARY OF THE INVENTION

The present invention provides techniques for improving an automatic baseform generation system. More particularly, the invention provides techniques for reducing insertion of spurious speech events in a word or phone sequence generated by an automatic baseform generation system. Automatic baseform generation or "acoustics-only" baseform generation performed using acoustic enrollment data is to be distinguished from hand-written baseform generation performed manually by a linguist.

In one illustrative aspect of the invention, such automatic baseform generation techniques may be accomplished by enhancing the scores of long-lasting speech events with respect to the scores of short-lasting events. For example, this may be achieved by merging competing candidates that relate to the same speech event (e.g., phone or word) and that overlap in time into a single candidate, the score of which may be equal to the sum of the scores of the merged candidates.

Advantageously, the invention offers a framework to rank speech events based not exclusively on their acoustic and transition scores but also on their persistence in time. Further, the invention is able to do this without the need for a priori knowledge on the phonology of the application and, therefore, the techniques are language-independent, costless and robust to a change of application.

As a result, when used in a baseform generation system, the invention allows to significantly reduce the number of spurious phones inserted in the automatically generated baseforms when compared to the corresponding hand-written baseforms (e.g., baseforms hand-written by a linguist).

Accordingly, the invention allows improvement of the speech recognition accuracy obtained with automatically generated baseforms when compared to conventional generation techniques. More particularly, the present invention overcomes disadvantages associated with conventional acoustics-only baseform generation systems, for example, in the following ways.

Conventional acoustics-only baseform generation systems do not exploit the peculiarities of the time structure inherent to phonetic baseforms, i.e., the baseform is selected regardless of the internal duration of each subphone unit. The conventional approaches disregard the fact that a subphone unit showing a medium score but for a long span of time, i.e., a persistent unit, may be a stronger candidate than a subphone unit showing a very high score during a short span of time. As a result, these techniques are prone to the insertions of spurious phones. The invention overcomes these and other disadvantages.

Further, the conventional acoustics-only baseform generation system that filters the generated baseforms by using a set of phonological rules has the major inconvenient of requiring the gathering of a priori knowledge on the phonology of the targeted vocabulary. Therefore, this conventional approach is language-dependent and also task-dependent. It is not cost-effective as it requires the expertise of a linguist every time a new language or a new task within a language is targeted. Besides, baseform generation systems are typically used to enroll proper names, the phonology of which is highly unpredictable, making it difficult to establish reliable phonological rules for these kind of applications. Therefore, in addition to being high-cost, baseform generation systems which rely on a priori knowledge of the phonology may not be very robust. The invention overcomes these and other disadvantages.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative speech recognition system. However, it is to be understood that the present invention is not limited to this or any particular speech recognition system. Rather, the invention is more generally applicable to any suitable speech recognition system in which it is desirable to realize improved automatic baseform generation by reducing spurious insertions in word or phone sequences. By way of example only, generalized speech recognition systems such as the commercially available large vocabulary IBM ViaVoice, ViaVoice Gold or Millennium Embedded systems (trademarks of IBM Corporation of Armonk, N.Y.) may be adapted to permit and/or perform automatic phonetic baseform generation in accordance with the invention.

Figure 1:
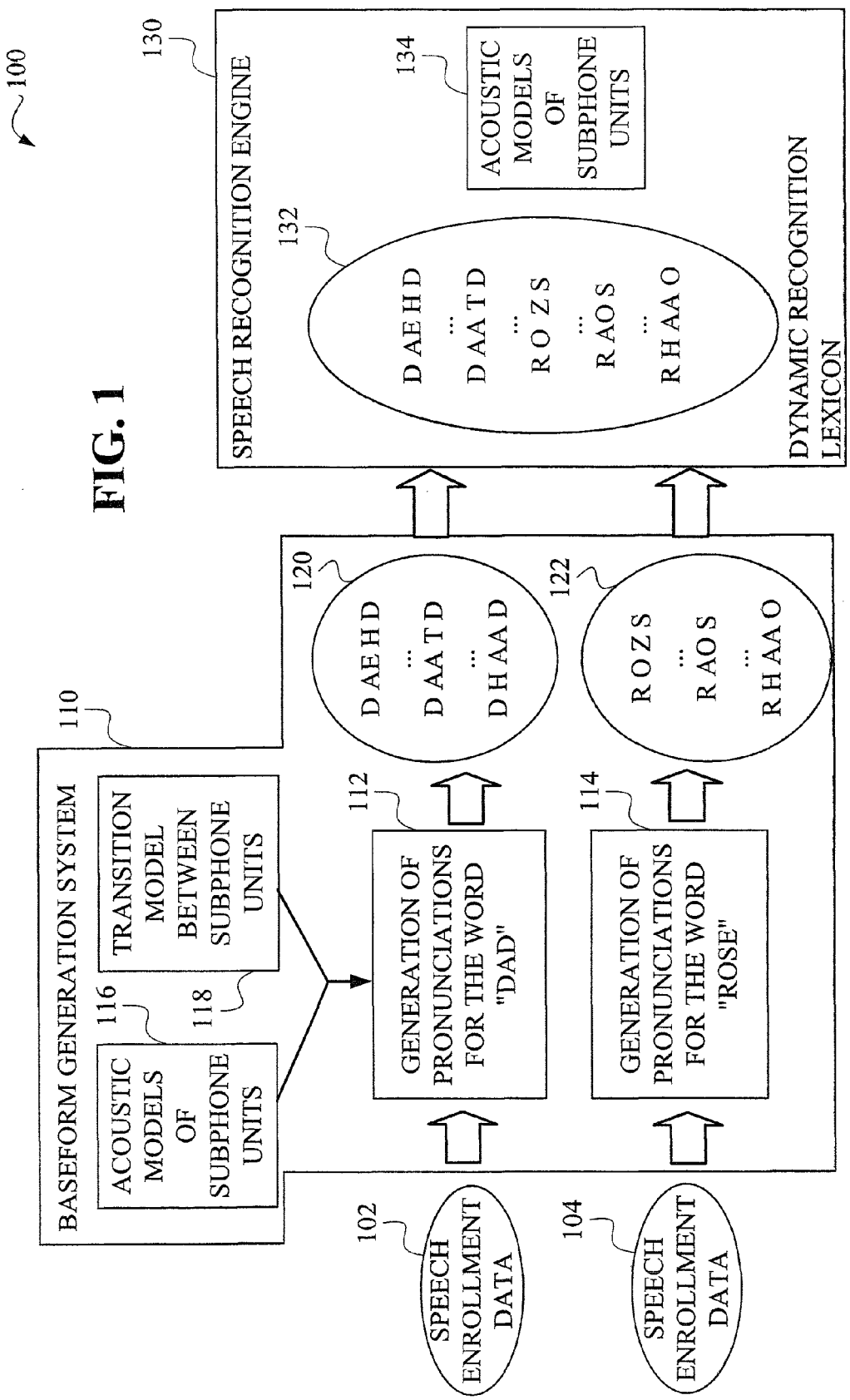
FIG. 1 is a block diagram illustrating a speech recognition system including an automatic baseform generation system in accordance with which the present invention may be implemented.

Referring initially to FIG. 1, a block diagram illustrates a speech recognition system including an automatic baseform generation system in accordance with which the present invention may be implemented. In general, FIG. 1 shows a speech recognition system using a dynamic lexicon obtained by automatically generating phonetic baseforms. For each word to enroll in the recognition vocabulary, phonetic baseforms are derived from a speech utterance of that word. The generation process relies on the combined use of acoustic models of subphone units, and of a model of transitions between subphone units. All distinct phonetic baseforms derived from the utterances of a word are added to the recognition lexicon as possible pronunciations of that word.

More particularly, as shown, a speech recognition system 100 includes a baseform generation system 110 and a speech recognition engine 130 with a dynamic recognition lexicon obtained by automatically generating phonetic baseforms. A user of the speech recognition system 100 utters words to be enrolled in the lexicon of the speech recognition system. For example, this may include out-of-vocabulary words which need to be added to the recognition lexicon, or in-vocabulary words for which new pronunciation variants need to be added to the recognition lexicon. As illustrated in FIG. 1, the user provides speech enrollment data 102 by uttering the word "DAD," and speech enrollment data 104 by uttering the word "ROSE." For each word to enroll in the recognition vocabulary, phonetic baseforms are derived from the speech utterance of that word. This is accomplished in blocks 112 and 114 which represent a phonetic baseform generation module. As will be explained, the derivation process relies on the combined use of acoustic models of subphone units 116, and of a model of transitions between subphone units 118. All distinct phonetic baseforms derived from the utterance of a word are added to the recognition lexicon 132 as possible pronunciations of that word.

Thus, as generally illustrated in FIG. 1, phonetic baseforms representing pronunciations for the word "DAD" are generated in block 112, e.g., "D AE H D," "D AA T D" and "D H AA D." Likewise, phonetic baseforms representing pronunciations for the word "ROSE" are generated in block 114, e.g., "R O Z S," "R AO S" and "R H AA O." Of course, more or less phonetic baseforms may be generated depending on the word or sound being enrolled. Each pronunciation becomes part of the dynamic recognition lexicon 132 of the speech recognition system 130, which may be used in accordance with acoustic models 134 to recognize real-time spoken utterances, as is well known in the art.

Figure 2:
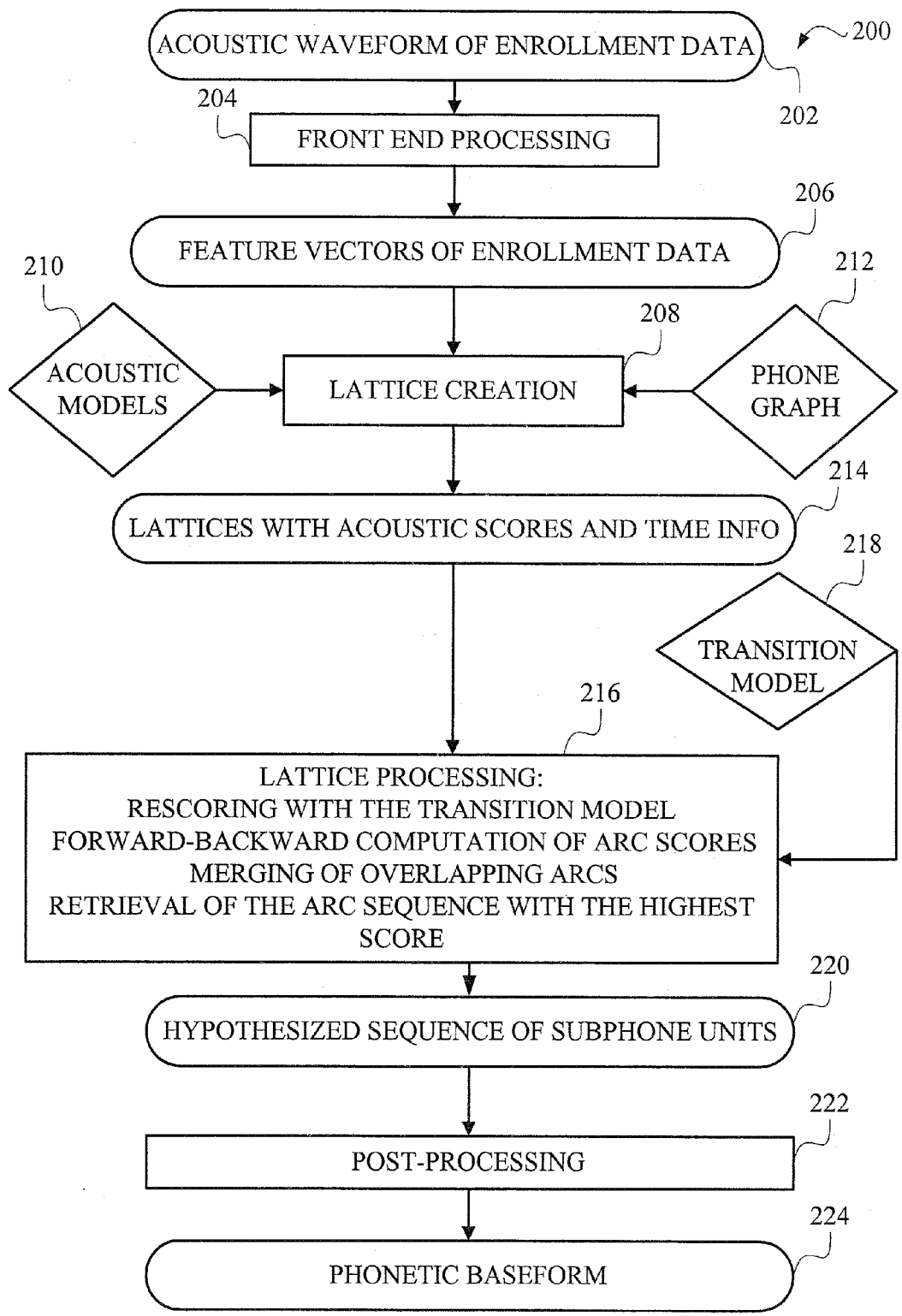
FIG. 2 is a flow diagram illustrating a methodology for automatically generating baseforms according to an embodiment of the present invention.

Referring now to FIG. 2, a flow diagram illustrates a methodology for generating baseforms according to an embodiment of the present invention. It is to be understood that FIG. 2 shows a methodology for automatically generating phonetic baseforms from a speech utterance of a word, in accordance with an embodiment of the invention. With regard to the speech recognition system of FIG. 1, it is to be understood that the methodology of FIG. 2 may be implemented by the phonetic baseform generation module collectively represented by blocks 112 and 114.

Thus, baseform generation methodology 200 begins in block 202 by inputting an acoustic waveform representing enrollment data (e.g., 102 or 104 of FIG. 1).

In step 204, "front end" processing is performed on the acoustic waveform. This refers to the process that transforms a speech waveform into a stream of feature vectors called the acoustic observations.

The operations of the "front end" of a speech recognition system (not shown in FIG. 1, but understood to reside between blocks 102/104 and blocks 112/114 of FIG. 1) are well known in the art. The front end generally receives speech data and generates representative feature vectors therefrom. This is accomplished in accordance with an audio-to-analog transducer (microphone) and an analog-to-digital converter which respectively transduce the utterances into an electrical signal and then convert the electrical signal into a digital signal representative of the speech uttered. Front end processing may sample the speech signal and partition the signal into overlapping frames so that each frame may be discretely processed. The sampled speech signal is typically recorded and provided to a feature extractor. The feature extractor receives the speech signal and, as is known in the art, extracts cepstral features from the signal at regular intervals, for example, about every 10 milliseconds. The cepstral features are in the form of feature or speech vectors (signals). While the above description gives an example of the operations that may be performed by in the front end processing step, it is to be understood that the invention is not limited to any particular acoustic observation generating techniques.

The results of the front end processing step 204 are feature vectors 206.

In step 206, lattice creation is performed. Lattice creation refers to the process that builds a lattice from an input stream of acoustic observations (feature vectors 206) by using acoustic models 210 and a phone graph 212.

The phone graph 212 defines the set of eligible phonetic baseforms, i.e., the set of phone sequences from which to retrieve a phonetic baseform for a given input stream of acoustic observations. The set of eligible phonetic baseforms may include all possible sequences of phones, where any phone can follow any other phone. At the acoustic level, each phone is described as a concatenation of subphone units (usually three subphone units), i.e., each acoustic model characterizes a subphone unit. Therefore, the phone graph 212 may be expanded into a subphone graph that defines the set of eligible subphone sequences.

In accordance with the present invention, a lattice is a subphone graph which specifies the starting and ending time, as well as the acoustic score, associated to each subphone in each eligible sequence of subphones. The starting and ending times and the acoustic scores of each subphone in a particular sequence of subphones are determined by finding the time-alignment with the highest likelihood between the input stream of acoustic observations and this sequence of subphones.

The likelihood of a time-alignment is computed by multiplying the acoustic scores of all the observations in the input stream of acoustic observations. The acoustic score of an observation is given by the acoustic model of the subphone unit with which it is aligned. This score measures the acoustic match between the observation and the acoustic model of the subphone unit.

The results of the lattice creation step 208 are lattices with acoustic scores and timing information, denoted as 214.

In step 216, lattice processing is performed. Lattice processing refers to the transformations that are applied to the lattice in order to produce the hypothesized sequence of subphones. As shown in the substeps of step 216, a lattice is first rescored by using the transition model 218 between the subphones. Then, a posterior probability is computed for each arc (also referred to as a link) in the lattice as the sum of the posterior probabilities of all the paths which go through that particular arc by preferably using the well-known Forward-Backward algorithm. Such algorithm is described in L. E. Baum et al. "A Maximization Technique Occurring in the Statistical Analysis of Probabilistic Function of Markov Chains," Annals of Mathematical Statistics, 41(1):164-171, 1970, the disclosure of which is incorporated by reference herein. Other techniques for computing the posterior probability for each arc in the lattice may be employed.

The topology of the lattice is then modified by merging all the arcs that bear the same subphone label and that overlap in time, while maintaining the arc order of the original lattice. Each new arc resulting from the merging of overlapping arcs is assigned a new score obtained by summing the posterior probabilities of all the merged arcs. The hypothesized sequence of subphone units is obtained as the sequence with the highest cumulative score in the transformed lattice. This hypothesized sequence is denoted as 220.

Lastly, in step 222, post processing is performed. Post-processing refers to the post-processing steps applied to the hypothesized sequence of subphone units in order to produce the sequence of phones hypothesized as the phonetic baseform of the enrollment data. The sequences of subphone units are converted into phonetic baseforms by replacing the subphone labels with their phone counterpart and by merging repeated phones. Beginning and ending silence labels are filtered out.

The result of the post-processing step is denoted as phonetic baseform 224. It is to be understood that this result becomes part of the dynamic recognition lexicon 132 of the speech recognition system 130. The methodology 200 may be repeated for additional enrollment data.

In accordance with one embodiment, the following components may be employed in accordance with the baseform generation methodology 200:

Acoustic model characterizing the subphone units: the acoustic model of the subphone units may preferably be context-dependent, i.e., each acoustic model describes a subphone unit in a given phonetic context.

Transition model: the transition model may be estimated off-line by aligning a large dataset of speech with a known transcription on the acoustic models of the subphone units, and by estimating a bigram language model on the labels of the subphone units in the alignment. This way, both the duration of the subphone units and the transition between the subphone units are modeled.

Multiple baseform generation: the invention may be implemented by adapting, in accordance with the descriptions provided herein, the multiple baseform generation systems described in the U.S. patent application identified by Ser. No. 09/698,470, filed on Oct. 27, 2000 and entitled "Methods and Apparatus for Automatic Generation of Multiple Pronunciations from Acoustic Data," and in S. Deligne et al., "Automatic Generation and Selection of Multiple Pronunciations for Dynamic Vocabularies," ICASSP 2001, the disclosures of which are incorporated by reference herein. Accordingly, in such a multiple baseform approach, all the distinct baseforms retrieved by rescoring the same lattice by assigning different weights to the acoustic scores and transition scores may be gathered in the same lexicon as pronunciation variants.

Figure 3:
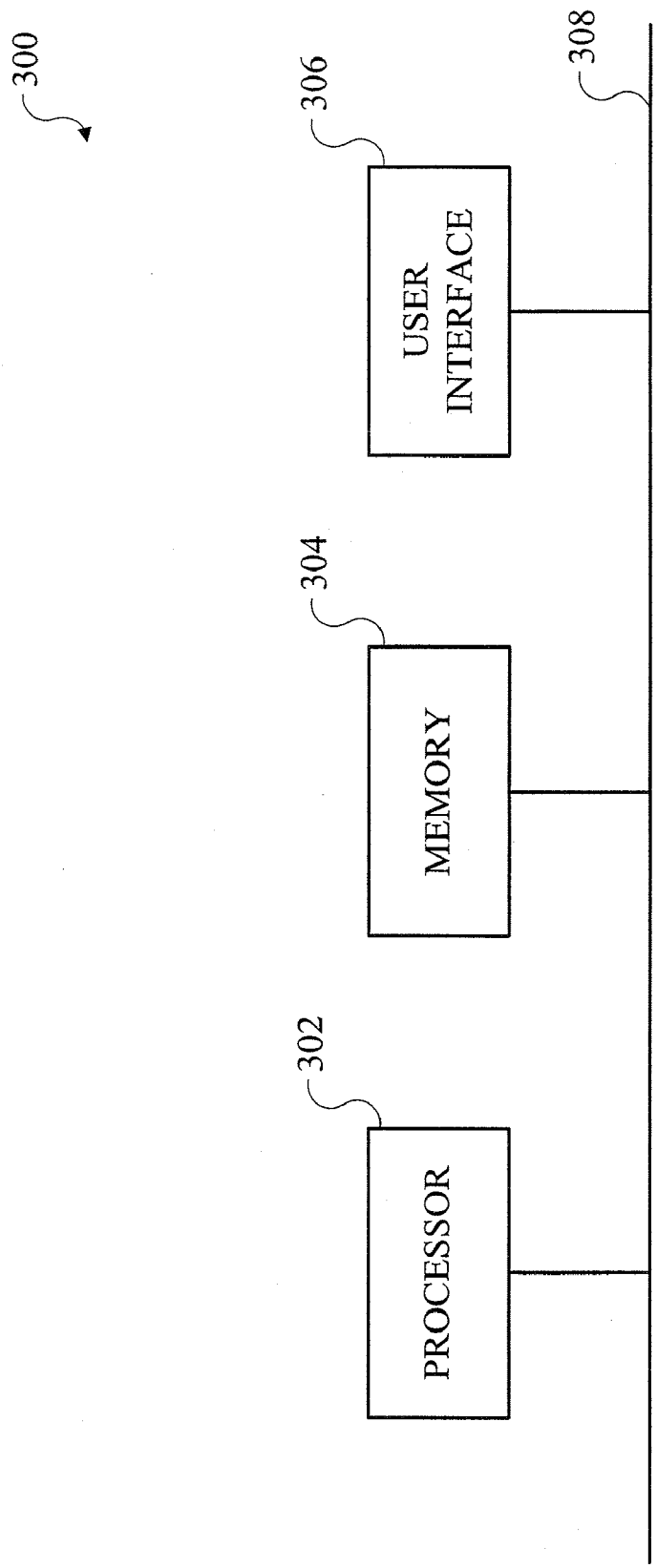
FIG. 3 is a block diagram of an illustrative hardware implementation of an automatic baseform generation system according to an embodiment of the present invention.

Referring now to FIG. 3, a block diagram of an illustrative hardware implementation of a speech recognition system employing automatic phonetic baseform generation according to the invention (e.g., as illustrated in FIGS. 1 and 2) is shown. In this particular implementation, a processor 302 for controlling and performing automatic phonetic baseform generation is coupled to a memory 304 and a user interface 306, via a bus denoted as 308. It is to be appreciated that the term "processor" as used herein is intended to include any processing device, such as, for example, one that includes a CPU (central processing unit) and/or other suitable processing circuitry. For example, the processor may be a digital signal processor, as is known in the art. Also the term "processor" may refer to more than one individual processor. The term "memory" as used herein is intended to include memory associated with a processor or CPU, such as RAM, ROM, a fixed, persistent memory device (e.g., hard drive), or a removable, persistent memory device (e.g., diskette or CDROM). In addition, the term "user interface" as used herein is intended to include, for example, a microphone for inputting speech data to the processing unit and preferably an audio speaker for outputting speech (e.g., synthesized speech data) and/or other data associated with the processing unit. The user interface may also include such devices as a keyboard, a mouse, a display, a printer, etc.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

In any case, it should be understood that the elements illustrated in FIGS. 1 and 2 may be implemented in various forms of hardware, software, or combinations thereof, e.g., one or more digital signal processors with associated memory, application-specific integrated circuit(s), functional circuitry, one or more appropriately programmed general purpose digital computers with associated memory, etc. It is also to be understood that the computing system illustrated in FIG. 3 may be implemented in the form of a variety of computer architectures, e.g., a personal computer, a personal digital assistant, a cellular phone, a microcomputer, a minicomputer, etc. However, the invention is not limited to any particular computer architecture. Given the teachings of the invention provided herein, one of ordinary skill in the related art will be able to contemplate other implementations of the elements of the invention.

The remainder of the detailed description now turns to an evaluation of an embodiment of the invention as employed in the context of speech recognition in a car.

It is assumed that all the speech data is recorded using a push-to-talk button in a quiet environment at 22 kHz (kilo-Hertz) and downsampled to 11 kHz. The front end computes 12 cepstra+the energy+delta and delta-delta coefficients from 15 ms (milliseconds) frames (see Chapter 3 in L. Rabiner and B. H. Juang, "Fundamentals of Speech Recognition," Prentice Hall Signal Processing Series, 1993). Baseforms are generated using a reduced-size acoustic model especially designed to be used in portable devices or in automotive applications. The acoustic model includes a set of speaker-independent acoustic models (156 subphones covering the phonetics of English) with about 5,000 context-dependent gaussians, trained on a few hundred hours of general English speech (about half of these training data has either digitally added car noise, or was recorded in a moving car at 30 and 60 miles per hour). The transition model between the subphones was a bigram model estimated off-line on an aligned corpus of about 100,000 sentences (general English and command sentences, names, addresses, digits).

Experiments are reported here with respect to two different sets of enrolled words: (i) the enrollment set E1 includes 50 distinct words, each word being repeated twice by ten speakers; and (ii) the enrollment set E2 includes 35 distinct words, each word being repeated once by 20 speakers. Speaker-dependent lexicons are formed for each speaker in, respectively, E1 and E2 following either a conventional baseform generation technique ("conventional approach") or the baseform generation technique of the present invention ("inventive approach").

First, the quality of the baseforms generated for the enrollment set E1 and E2 by either the conventional approach or the inventive approach is compared in terms of the phone substitution rate, phone deletion rate, phone insertion rate and overall phone error rate in the baseforms automatically generated by either approach with respect to the hand-written baseforms. The phone substitution rate, phone deletion rate, phone insertion rate and phone error rate shown in Table 1 are computed as:

TABLE 1

$$\text{phone substitution rate} = \frac{\text{total number of substituted phones in the generated baseforms}}{\text{total number of phones in the hand-written baseforms}}$$

$$\text{phone deletion rate} = \frac{\text{total number of deleted phones in the generated baseforms}}{\text{total number of phones in the hand-written baseforms}}$$

$$\text{phone insertion rate} = \frac{\text{total number of inserted phones in the generated baseforms}}{\text{total number of phones in the hand-written baseforms}}$$

phone error rate = submission rate + deletion rate + insertion rate

| | Phone substitution rate | Phone deletion rate | Phone Insertion rate | Phone Error rate |
|---|---|---|---|---|
| Conventional approach | 42.8% | 2.8% | 45.3% | 90.9% |
| Inventive approach | 42.7% | 6.1% | 26.4% | 75.2% |

TABLE 1-continued

As shown by the numbers in Table 1, the invention approach allows a 17% (percent) relative reduction of the phone error rate in the generated baseforms with respect to the conventional approach. The reduction of the phone error rate when using the inventive approach comes from the reduction of the percentage of phones wrongly inserted in the generated baseforms, from 45.3% down to 26.4%.

Second, the quality of the baseforms generated for the enrollment set E1 and E2 by either the conventional approach or by the inventive approach is compared in terms of the word error rate obtained when using the baseforms generated by either approach in a speech recognition system. The baseforms generated for each speaker in the enrollment set E1 are evaluated on two test sets: (i) the test set T1.1 where each of the 50 words in E1 are repeated in isolation ten times by each of the same ten speakers; and (ii) the test set T1.2 where each of the 50 words in E1 are repeated in ten different short sentences (typically command sentences like "ADD <name> TO THE LIST," where <name> is an enrolled word) by each of the same ten speakers. The recognition lexicons derived for each speaker in the enrollment set E2 are evaluated on three test sets: (i) the test set T2.1 is recorded in a quiet environment; (ii) the test set T2.2 is recorded in a car moving at 30 mph; and (iii) the test set T2.3 is recorded in a car moving at 60 mph. All three sets T2.1, T2.2 and T2.3 include the 35 words in E2 uttered once and preceded by either the word "CALL," "DIAL" or "EMAIL" by each of the speakers in E2. The baseforms of the command words "CALL," "DIAL" or "EMAIL" in the test sets are linguist-written baseforms.

The word error rates shown in Table 2 are computed as:

TABLE 2

$$\text{word error rate} = \frac{\text{number of substituted, deleted, inserted words in the transcription output by the recognition systems}}{\text{total number of words in the correct transcription}}$$

| | Conventional approach | Inventive approach |
|---|---|---|
| Test set T1.1 | 4.8 | 2.7 |
| Test set T1.2 | 2.7 | 1.9 |
| Test set T2.1 | 8 | 6.8 |
| Test set T2.2 | 8.7 | 6.6 |
| Test set T2.3 | 10.8 | 9.2 |
| All test sets | 4.1 | 2.9 |

As shown in Table 2, the inventive approach allows to consistently reduce the word error rate obtained on each test set, resulting in an overall 30% relative reduction of the word error rate with respect to the conventional approach.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. Apparatus for automatically generating a phonetic baseform from a spoken utterance, the apparatus comprising:
   at least one storage medium; and
   at least one processor coupled to the at least one storage medium and operative to (i) obtain a stream of acoustic observations representing the spoken utterance; (ii) generate a sequence of subphone units representing candidate subphone units substantially maximizing a likelihood associated with the stream of acoustic observations; and (iii) convert the sequence of subphone units into a phonetic baseform;

wherein the generating operation comprises merging candidate subphone units that relate to a same speech event and that overlap in time into a single candidate subphone unit, and associating with the single candidate subphone unit a score equal to a sum of scores associated with the merged candidate subphone units such that a score associated with a longer-lasting speech event is enhanced as compared with a score associated with a shorter-lasting speech event.

2. The apparatus of claim 1, wherein the generating operation further comprises building a lattice from the stream of acoustic observations using acoustic models and a phone graph.

3. The apparatus of claim 2, wherein the lattice is a subphone graph specifying a starting time, an ending time and an acoustic score associated to each subphone in a candidate sequence of subphones.

4. The apparatus of claim 2, wherein the generating operation further comprises transforming the lattice to produce the generated sequence of subphone units.

5. The apparatus of claim 4, wherein the transforming operation further comprises rescoring the lattice by using a transition model between the subphone units.

6. The apparatus of claim 5, wherein the lattice comprises arcs and the transforming operation further comprises computing a posterior probability for each arc in the lattice as a sum of posterior probabilities of paths which go through that particular arc.

7. The apparatus of claim 6, wherein the transforming operation further comprises modifying a topology of the lattice by merging arcs that bear a same subphone label and that overlap in time, while maintaining an arc order of the original lattice.

8. The apparatus of claim 7, wherein the transforming operation further comprises assigning a new score to each new arc resulting from the merging of overlapping arcs by summing posterior probabilities of the merged arcs.

9. The apparatus of claim 8, wherein the transforming operation further comprises identifying the generated sequence of subphone units as the sequence with the highest cumulative score in the transformed lattice.

10. An article of manufacture comprising at least one computer-readable storage medium encoded with one or more computer-executable programs which, when executed by at least one computer system, implement steps of:

obtaining a stream of acoustic observations representing a spoken utterance;

generating a sequence of subphone units representing candidate subphone units substantially maximizing a likelihood associated with the stream of acoustic observations; and converting the sequence of subphone units into a phonetic baseform;

wherein the generating step comprises merging candidate subphone units that relate to a same speech event and that overlap in time into a single candidate subphone unit, and associating with the single candidate subphone unit a score equal to a sum of scores associated with the merged candidate subphone units such that a score associated with a longer-lasting speech event is enhanced as compared with a score associated with a shorter-lasting speech event.

11. A speech recognition system, comprising:

a speech recognition engine; and a recognition lexicon associated with the speech recognition engine, the recognition lexicon including at least one phonetic baseform automatically generated by: (i) obtaining a stream of acoustic observations representing a spoken utterance; (ii) generating a sequence of subphone units representing candidate subphone units substantially maximizing a likelihood associated with the stream of acoustic observations, wherein the generating comprises merging candidate subphone units that relate to a same speech event and that overlap in time into a single candidate subphone unit, and associating with the single candidate subphone unit a score equal to a sum of scores associated with the merged candidate subphone units such that a score associated with a longer-lasting speech event is enhanced as compared with a score associated with a shorter-lasting speech event; and (iii) converting the sequence of subphone units into the at least one phonetic baseform.

\* \* \* \* \*